United States Patent
Adams (10) Patent No.: US 7,941,682 B2
(45) Date of Patent: May 10, 2011

(54) OPTIMUM POWER MANAGEMENT OF SYSTEM ON CHIP BASED ON TIERED STATES OF OPERATION

(75) Inventor: Lewis Adams, Carmel, CA (US)

(73) Assignee: Gainspan, Inc., Sunnyvale, CA (US)

( * ) Notice: Subject to any disclaimer, the term of this patent is extended or adjusted under 35 U.S.C. 154(b) by 1004 days.

(21) Appl. No.: 11/801,460

(22) Filed: May 9, 2007

(65) Prior Publication Data

US 2008/0282101 A1 Nov. 13, 2008

(51) Int. Cl.
*G06F 1/26* (2006.01)
*G06F 1/32* (2006.01)

(52) U.S. Cl. ......... 713/322; 713/300; 713/320; 713/324

(58) Field of Classification Search .................. 713/300, 713/320, 322, 324
See application file for complete search history.

(56) References Cited

U.S. PATENT DOCUMENTS

| | | | |
|---|---|---|---|
| 5,410,714 A | 4/1995 | Yorimoto et al. | |
| 5,790,839 A | 8/1998 | Luk et al. | |
| 5,883,814 A | 3/1999 | Luk et al. | |
| 6,249,167 B1 | 6/2001 | Oguchi et al. | |
| 6,523,126 B1* | 2/2003 | Brabenac | 713/323 |
| 7,298,178 B1* | 11/2007 | Sun et al. | 327/10 |
| 7,586,079 B2* | 9/2009 | Mullin et al. | 250/214 R |
| 2004/0002315 A1 | 1/2004 | Lin | |
| 2005/0094036 A1 | 5/2005 | Tichelaar | |
| 2005/0179935 A1* | 8/2005 | Ogura et al. | 358/1.14 |
| 2005/0180233 A1 | 8/2005 | Das et al. | |
| 2005/0198458 A1 | 9/2005 | Cho | |
| 2005/0270109 A1 | 12/2005 | Ha | |
| 2005/0278676 A1 | 12/2005 | Dhanwada et al. | |
| 2005/0289361 A1 | 12/2005 | Sutardja | |
| 2006/0047991 A1* | 3/2006 | Leung et al. | 713/500 |
| 2006/0174100 A1 | 8/2006 | Park | |
| 2006/0253718 A1* | 11/2006 | Kawase et al. | 713/300 |
| 2007/0094525 A1 | 4/2007 | Uguen et al. | |
| 2007/0174514 A1 | 7/2007 | Lee et al. | |
| 2008/0104433 A1* | 5/2008 | May et al. | 713/300 |
| 2009/0040954 A1* | 2/2009 | Usuba | 370/311 |

(Continued)

FOREIGN PATENT DOCUMENTS

WO WO 2007077516 7/2007

OTHER PUBLICATIONS

Muresan (R), Power Smart-System-On-Chip Architecture for Embedded Cryptosystems,University of Guelph, School of Engineering Guelph, Canada, N1G 2W1, Guelph, Canada.

(Continued)

*Primary Examiner* — Vincent T Tran (57) ABSTRACT

Optimum power management of system on chip based on tiered states of operation is disclosed. In one embodiment, a system on chip includes a hardware module including one or more of a microcontroller, a microprocessor, a DSP core, a memory, a timing source, a peripheral, and an external interface to have a real time counter module of the peripheral isolated from a rest of the hardware module using a plurality of voltage level shifting cells and/or a plurality of voltage island cells. Also, the system on chip includes a software module associated with the real time counter module to generate one or more control signals to one or more devices external to the system on chip during a sleep mode of the system on chip.

20 Claims, 10 Drawing Sheets

U.S. PATENT DOCUMENTS

2010/0061431 A1* 3/2010 Jyrkka et al. .................. 375/220

OTHER PUBLICATIONS

Power Reduction Techniques for Ultra-Low Power Solutions, 2004, Virage Logic Corporation, California, USA.

Khan (Z), Low power system on chip bus encoding scheme with crosstalk noise reduction capability, 2006, 153-2, IEEE, Edinburgh, UK.

Backenius (Erik)Reduction of Substrate Noise in Mixed-Signal Circuits, 2007, Linköping University, Department of Electrical Engineering.

CoolChip™: ASC's Low Power Optimization Solution, Alternative System Concepts, Inc.

* cited by examiner

OPTIMUM POWER MANAGEMENT OF SYSTEM ON CHIP BASED ON TIERED STATES OF OPERATION

FIELD OF TECHNOLOGY

This disclosure relates generally to technical fields of system on chip and, in one embodiment, to a system and/or method of optimum power management of system on chip based on tiered states of operation, comprising controlling the clock and other components that are enabled during certain states of the system on chip.

BACKGROUND

A system on chip may have all components of a computer and/or other electronic system into a single integrated circuit chip. The system on chip may contain any of digital, analog, and mixed-signal functions (e.g., as well as a radio-frequency function) all on one chip. The system on chip may have a microcontroller, a microprocessor, a DSP core, a memory block, a timing source, a peripheral, an external interface, and/or a power management circuit. The various hardware parts of the system on chip may be connected by buses (e.g., an AMBA bus, an APB, etc.). The system on chip may also include a number of software modules embedded on the system on chip to control operations of the various hardware parts.

The system on chip may communicate with an external device (e.g., a sensor device) to monitor the external device and/or report a data obtained by the external device to a controller (e.g., a program able logic controller) through a network. To monitor the external device, the system on chip may stay on continuously and/or periodically wake itself up according to a set schedule. When the system on chip is operating in a wireless mode, the continuous operation of the system on chip may quickly drain a power source (e.g., a local battery) of the system on chip.

Although the periodic wake-up of the system on chip to do the monitoring may reduce the drain of the power source to some degree, it may still exhaust the power source rather quickly so as to require a frequent replenishment of the power source. Aside from the drainage of the power source, there may exist a danger of losing the data (e.g., important) which should have been reported to the controller if the system on chip is disabled due to the exhaustion of the power source.

SUMMARY

Optimum power management of system on chip based on tiered states of operation is disclosed. In one aspect, a system on chip (e.g., which draws about 3 micro amps during the sleep mode compared to 300 milli-amps drawn by the system on chip when the rest of the hardware module is operational) includes a hardware module including one or more of a microcontroller, a microprocessor, a DSP core, a memory, a timing source, a peripheral, and an external interface to have a real time counter module isolated from the rest of the hardware module using one or more voltage level shifting cells and/or one or more voltage island cells (e.g., which are placed between the real time counter module and the rest of the hardware module such that two different voltages are separately applied to the real time counter module and the rest of the hardware module).

Also, the system on chip includes a software module associated with the real time counter module to generate one or more control signals to one or more devices external to the system on chip during a sleep mode (e.g., the sleep mode to place any unused part of the system on chip in a non-operational mode to reduce the power consumption of the system on chip) of the system on chip to communicate with the one or more devices.

The system on chip may also include a base counter (e.g., the base counter is automatically reset when a new battery is coupled to the real time counter module) of the real time counter module to keep track of the current time. The system on chip may further include a voltage regulator counter of the real time counter module to generate a wake-up signal to a voltage regulator internal or external to the system on chip to supply the rest of the hardware module with an output voltage of the voltage regulator based on a preprogrammed schedule and/or a response signal of the one or more devices (e.g., a sensor device). Also, the system on chip may include a device counter of the real time counter module to generate the one or more control signals to access the one or more devices to obtain the response signal (e.g., the response signal includes an alarm signal generated by the one or more devices, etc.).

In addition, the system on chip may include a clock generator (e.g., the clock generator includes one or more frequencies (e.g., 32 kHz, 131 kHz, etc.) coupled to the real time counter module which uses a high bias current at startup and which subsequently reduces the high bias current (e.g., by about 400 percent) based on an algorithm of the software module. Moreover, the system on chip may include a keep alive memory (e.g., a random access memory of 512 bytes) to store a latest reading of the one or more devices. Furthermore, the system on chip may include a non-volatile register to store a configuration parameter (e.g., a reset release timing) of the real time counter module.

In another aspect, a method includes placing any unused part of a system on chip in a non-operational mode to reduce a power consumption of the system on chip and directly supplying power to a real time counter module internally isolated from any unused part of the system on chip to prevent current leakage to any unused part of the system on chip. The method also includes generating one or more control signals to a device external to the system on chip using the real time counter module during the non-operational mode to control the device.

The method may further include generating a wake-up signal when a response data of the device is an alarm signal corresponding to the one or more control signals. The method may also include placing any unused part of the system on chip in an operational mode through processing the wake-up signal. In addition, the method may include minimizing the duration of the system on chip in the operational mode to decrease the power consumption through delaying the placing of any unused part of the system on chip in the operational mode until the device is ready to process the control signal of the system on chip. Furthermore, the method of claim 13 may include communicating the response data to a controller coupled to the system on chip and placing the rest of the unused part of the system on chip in the non-operational mode when communicating the response data to the controller is completed.

Also, the method may include directly connecting a battery (e.g., which ranges between 1.2 volts and 3.6 volts) to the real time counter module and gating the power supplied to the unused part of the system on chip using an internal or external voltage regulator controlled by the real time counter module. In addition, the method may include storing and/or time-stamping the alarm signal of the device to registers of the real time counter module.

In yet another aspect, a system includes one or more external devices to perform one or more functions based on a control signal processed in each of the one or more external devices and a system on chip having a real time counter module communicatively coupled to the one more external devices to periodically generate the control signal during a non-operational stage of the system on chip to minimize the power consumption of the system on chip. In addition, the system may also include a wireless module of the system on chip to communicate with an access point associated with the system on chip using a radio based on an alarm signal generated by the each of the plurality of external devices.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Optimum power management of a system on chip based on tiered states of operation is disclosed. In the following description, for purposes of explanation, numerous specific details are set forth in order to provide a thorough understanding of the various embodiments. It will be evident, however, to one skilled in the art that the various embodiments may be practiced without these specific details.

Figure 1:
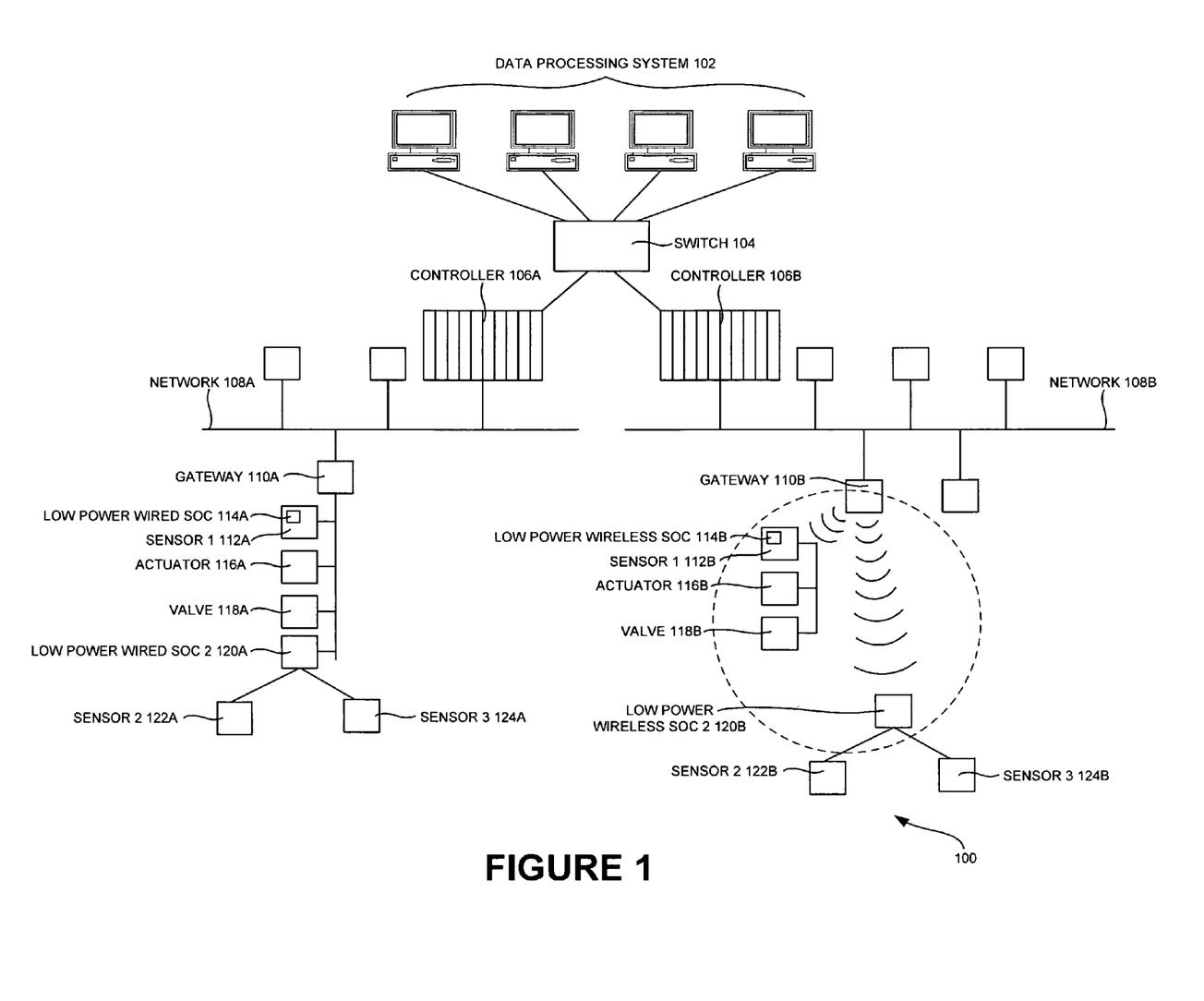
FIG. 1 is a network view of a low power system on chip interacting with a controller and/or a number of external devices, according to one embodiment.

In one embodiment, a system on chip (e.g., a low power wired/wireless SOC 114 and/or a low power wired/wireless SOC 120 of FIG. 1) includes a hardware module including one or more of a microcontroller, a microprocessor, a DSP core, a memory, a timing source, a peripheral, and an external interface to have a real time counter module (e.g., a RTC module 502 of FIG. 5) isolated from the rest of the hardware module (e.g., the rest of SOC 504) using a plurality of voltage level shifting cells and/or a plurality of voltage island cells (e.g., an isolation logic 506). Also, the system on chip includes a software module (e.g., an application platform 214 of FIG. 2) associated with the real time counter module to generate one or more control signals (e.g., a control signal 524 of FIG. 5) to one or more devices (e.g., a device 626 of FIG. 6) external to the system on chip during a sleep mode of the system on chip to communicate with the one or more devices.

In another embodiment, a method includes placing any unused part of a system on chip in a non-operational mode to reduce the power consumption of the system on chip and directly supplying power to a real time counter module internally isolated from the any unused part of the system on chip to prevent current leakage to the unused part of the system on chip. The method also includes generating one or more control signals to a device external to the system on chip using the real time counter module during the non-operational mode to control the device.

In yet another embodiment, a system includes one or more external devices to perform at least one function based on a control signal processed in each of the one or more external devices and a system on chip having a real time counter module communicatively coupled to the one or more external devices to periodically generate the control signal during a non-operational stage of the system on chip to minimize a power consumption of the system on chip.

FIG. 1 is a network view of a low power system on chip 114 interacting with a controller 106 and/or a number of external devices, according to one embodiment. A low power system on chip (SOC) 1 114 (e.g., a low power wired SOC 1 114A and/or a low power wireless SOC 1 114B) embedded in a sensor 112 may connect the number of external devices (e.g., a sensor 1 112, an actuator 116, a valve 118, etc.) to a gateway 110 (e.g., an access point). The gateway 110 may be connected to a network 108 (e.g., a WAN, a LAN, a WLAN, the internet etc.) which may in turn be connected to other gateways communicating with other devices.

A low power SOC 120 (e.g., a low power wired SOC 2 120A and/or a low power wireless SOC 2 120B) may also externally control a sensor (e.g., a sensor 2 122 and/or a sensor 3 124). The network 108 (e.g., the network 108A and/or the network 108B) may be connected to the controller 106 (e.g., the controller 106A and/or the controller 106B) which may be used to control a transmission of data over the network 108, the devices, and/or a switch 104 (e.g., which may be used to regulate the transmission of data between a data processing system 102 and/or the controller 106).

Figure 2:
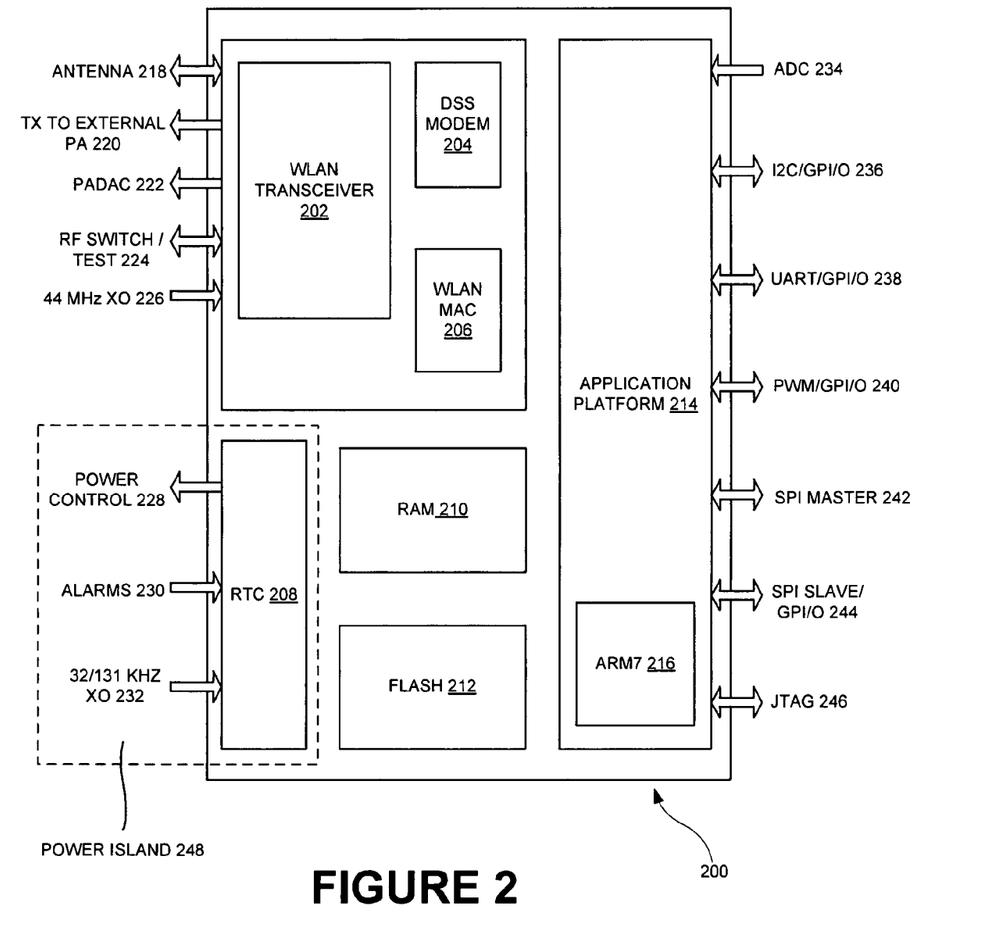
FIG. 2 is a schematic diagram of a low power wireless system on chip (SOC) having a real time counter module islanded from the rest of the low power system on chip, according to one embodiment.

FIG. 2 is a schematic diagram of a low power wireless system on chip (SOC) 200 having a real time counter module 208 islanded from the rest of the system on chip, according to one embodiment. The low power wireless SOC 200 includes a dual-processor system (e.g., ARM7 216 based) with a direct-sequence spread spectrum (DSSS) Modem 204 (e.g., an IEEE 802.11b) and a WLAN transceiver 202 in a single chip. The low power wireless SOC 200 may be used by a wireless facility to monitor environmental conditions (e.g., a temperature, an occupancy, a humidity, a radiation, a vibration, a pressure, etc.).

In one example embodiment, the low power wireless SOC 200 may have a 2.4 GHz complementary metal-oxide-semiconductor (CMOS) WLAN transceiver 202, which may have an embedded power amplifier (PA) with a programmable output power (e.g., up to 12 dBm). The PA output may be merged with low-noise amplifier (LNA) inputs. The direct-sequence spread spectrum (DSSS) modem 204 may modulate for data rates (e.g., 1 Mb/s and/or 2 Mb/s). A transmitted signal of the DSSS modem 204 mat take up more bandwidth than the information signal that is being modulated (e.g., where the name 'spread-spectrum' comes from the fact that the carrier signals occur over the full bandwidth (spectrum) of a device's transmitting frequency).

The DSSS modem may multiply the data being transmitted by a noise signal, which is a pseudorandom sequence of 1 and −1 values, at a frequency much higher than that of the original signal, thereby spreading the energy of the original signal into a much wider band. The resulting signal may resemble a white noise, except that the resulting signal may be filtered out at the receiving end to recover the original signal by multiplying the same pseudorandom sequence to the received signal (because 1×1=1, and −1×−1=1).

As shown in FIG. 2, the low power wireless SOC 200 may have a WLAN medium access control (MAC) 206, which may provide addressing and channel access control mechanisms that may make it possible for several terminals and/or network nodes to communicate with the WLAN transceiver 202. The MAC data communication protocol sub-layer may be a part of the seven-layer OSI model data link layer (layer 2). The MAC sub-layer may act as an interface between the Logical Link Control sub-layer and the network's physical layer. The MAC layer may provide an addressing mechanism called physical address or MAC address (e.g., a unique serial number which may be assigned to each network adapter, making it possible to deliver data packets to a destination within a sub-network, which may be a physical network without routers, e.g., an Ethernet LAN, WLAN, etc.). The low power system on low power wireless SOC 200 may include high-throughput hardware with two small private random access memories (RAM) for encryption/decryption, hardware co-processing for demanding lower-MAC tasks and hardware support of IEEE 802.11i, (e.g., Counter Mode with Cipher Block Chaining Message Authentication Code Protocol (CCMP), which is a full security IEEE 802.11i encryption protocol).

The application platform (APP) 214 may be a dual processor platform which may include two ARM7 216, one to run the WLAN software and the other to run the application software, running at specified frequency (e.g., 11, 22, 44 MHz). The ARM architecture may be a 32-bit reduced instruction set computer (RISC) architecture that may widely be used in a number of embedded designs. Due to their power saving features, ARM central processing units (CPU) are dominant in the mobile electronics market, where low power consumption is a critical design goal. The APP may be based on two separated AMBA high performance busses (AHB) to maximize the bandwidth allowed to each CPU (e.g., to avoid time-sharing when using the bus so that both CPUs are fully operational at all times). The CPUs may also be equipped with Joint Test Action Group (JTAG) test access ports 246 for hardware debug purposes.

The low power wireless SOC 200 may include a random access memory (RAM) 210 including a shared memory of 192K bytes for both CPUs and dedicated RAM of 32K bytes for the WLAN CPU. The shared RAM may be mainly used by the APP CPU and may contain the data frames for inter-CPU communication. However, the shared RAM may also be used by the WLAN CPU during software update procedures and for future extensions of the WLAN stack if feasible. As illustrated in FIG. 2 the low power wireless SOC 200 also may have 384K bytes of embedded Flash memory 212 which may be used to update the firmware. The on-chip start-up code may be located in a dedicated boot ROM which may be divided for the use of each CPU.

FIG. 2 also illustrates a Real Time Clock (RTC) 208 which may provide global time and/or date to the low power wireless SOC 200. The RTC 208 may contain a low-power crystal oscillator that may support a 32.768 kHz crystal and/or a 131.072 kHz crystal 232. The RTC 208 may run on a dedicated power supply, ranging between 1.2V and 3.6V. Three programmable wrap-around alarm counters may be provided to enable periodic wake-up of the low power wireless SOC 200 and two independent external components. Two alarm inputs 230 (e.g., external) may enable wake-up of the low power wireless SOC 200 on external events.

The interfaces may include support of an external serial $E^2PROM$ parameter memory and/or a serial flash data memory through a serial peripheral interface (SPI), two multi-purpose universal asynchronous receiver/transmitter (UART) interfaces 238, external CPU interfaces via SPI master 242 and SPI slave/GPI/O 244 interface, up to 32 General Purpose I/Os, three pulse-width modulated (PWM) function outputs 240, and $I^2C$ master and slave interface 236. The interfaces may also include support for two 10 bits 32K samples/ADC channels 234, two alarm inputs 230, three control outputs for power supply 228, external radio frequency (RF) switches/test 224, and support for external power amplifier, such as, dedicated transmitter (Tx) output 220 and PA digital-to-analog converter (DAC) output 222. The low power wireless SOC 200 may be connected to an antenna 218 to receive and/or transmit data to and/or from an access point. Along with low-power modes to be described in FIG. 4, the low power wireless SOC 200 may also have power supply monitoring and/or temperature monitoring capabilities. These features may help the device be alert for over and under voltage fault conditions.

Furthermore, a hardware module of the low power wireless SOC 200 (e.g. which includes one or more of a microcontroller, a microprocessor, a DSP core, a memory, a timing source, a peripheral, an external interface, etc.) has the real time counter (RTC) 208 of the peripheral isolated from a rest of the hardware module using more than one voltage level shifting cells and/or more than one voltage island cells (e.g., which is placed between the RTC 208 and the rest of the hardware module such that two different voltages are separately applied to the RTC 208 and the rest of the hardware module). Also, a software module (e.g., of the application platform 214) associated with the RTC 208 may generate one or more control signals to one or more devices external to the low power wireless SOC 200 during a sleep mode (e.g., the sleep mode places any unused part of the low power wireless SOC 200 in a non-operational mode to reduce power consumption) of the low power wireless SOC 200 to communicate with the one or more devices.

Figure 3:
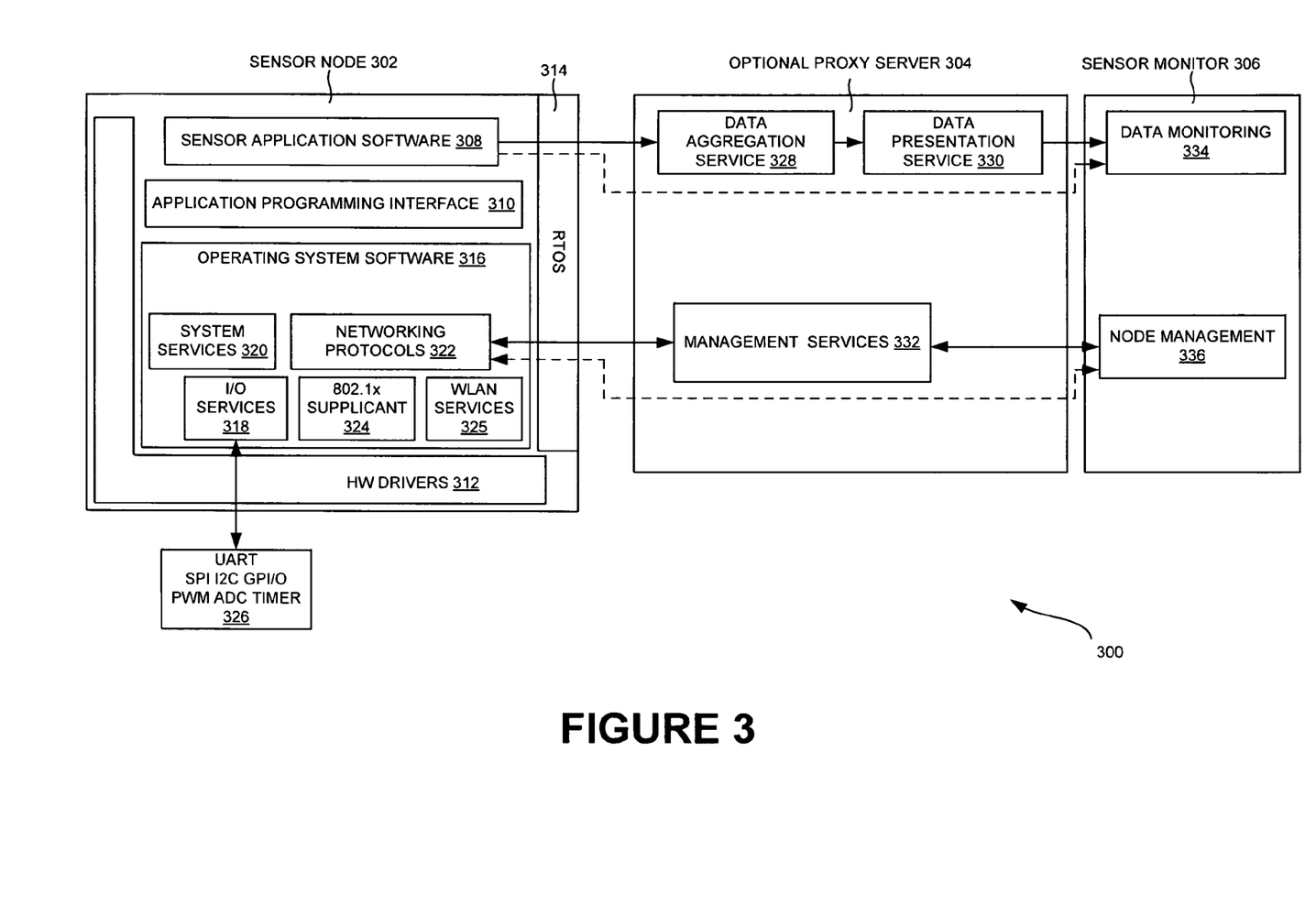
FIG. 3 is an interaction diagram of software modules of the low power wireless SOC of FIG. 2, according to one embodiment.

FIG. 3 is an interaction diagram of software modules of the low power wireless SOC of FIG. 2, according to one embodiment. A sensor node 302 may denote the location of a particular sensor (e.g., and/or other external devices) connected to the low power wireless SOC 200. The sensor node 302 may contain a sensor application software 308 which may be used to control the sensor (e.g., and/or other external devices) via a real-time operating system (RTOS) 314. The RTOS 314 may be a class of operating system intended for real-time applications. The RTOS 314 may operate on the hardware (HW) using hardware (HW) drivers 312. An operating system software 316, which may include system services 320, may act as an intermediary between the RTOS 314 and the HW drivers 312, networking protocols 322, a 802.1x supplicant 324, WLAN services 325 and I/O services 318 via a UART, SPI, I2C, GPIO, PWM, ADC, TIMER, etc. 326.

The sensor application software 308 may transmit the data to an optional proxy server 304 which may be used to manage communication of data and/or operation commands between the sensor node 302 and the sensor monitor 306. In another example embodiment, the data may be transmitted directly from the sensor application software 308 to the sensor monitor 306 (e.g., thus not requiring the service of the optional proxy server 304). In the optional proxy server 304, the data may be stacked in a data aggregation service 328 and/or may be organized and formatted in a data presentation service 330 so that it may be communicated to the sensor monitor 306. A management services module 332 in the optional proxy server 304 may be used to manage communication between the sensor node 302 and the sensor monitor 306. The data may finally be presented to the data monitoring 334 module (e.g., in the sensor monitor 306) which performs data processing/analysis based on an operator and/or a software within the data monitoring module 334 to issue commands to the sensor node 302.

Figure 4:
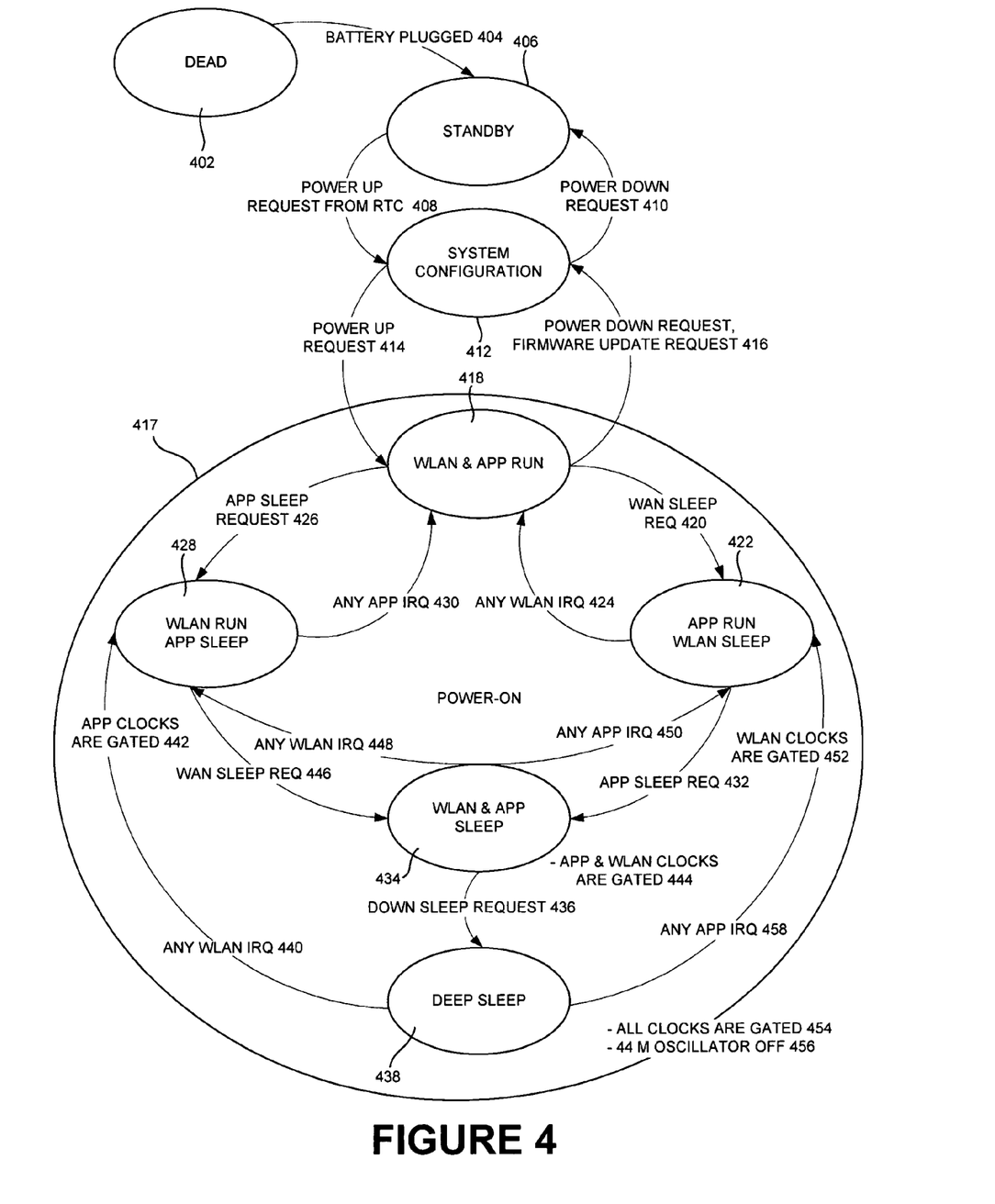
FIG. 4 is a state diagram of the low power wireless SOC of FIG. 2, according to one embodiment.

FIG. 4 is a state diagram of the low power wireless SOC 200 of FIG. 2, according to one embodiment. A dead state 402 may imply that no power source is connected to the system. When a battery 404 is plugged in, the real time clock (RTC) 208 may be powered up and the low power wireless SOC 200 makes a transition from the dead state 402 to a stand-by state 406. The RTC 208 may be supplied directly from a battery (e.g., a battery plugged 404). Here, the low power wireless SOC 200 may show the lowest power consumption. The stand-by state 406 may be entered between active phases. When a power up request 408 is made by the RTC module, the low power wireless SOC 200 makes a transition from the stand-by state 406 to a system configuration state 412.

To switch on the low power wireless SOC 200, a DC/DC converter (e.g., regulating a voltage input to the low power wireless SOC 200) needs to be on, the power isolation from the RTC 208 needs to be removed, and/or a 44 MHz oscillator needs to be switched on. In this state, only a reset of the WLAN subsystem may get released by the RTC 208. A WLAN CPU may execute required system configurations before the low power wireless SOC 200 moves on to a general operation state, through another power-up request 414 to switch to a power-on state 417. The system configuration state 412 may also make a transition from the power-on state 417 to the system configuration state 412 using a power-down request 416, and/or a firmware update request 416.

Another power-down request 410 may be made to make a transition from the system configuration state 412 to the stand-by state 406. The power-on state 417 may be an active state where the low power wireless SOC 200 is running. The power-on state 417 may have various sub-states, when unused parts of the system may be programmed to be in a non-operational mode reducing power consumption. These sub-states may be combined in a sleep state, which may be generically defined as a low-power condition. The several sub-states of sleep (e.g., the APP RUN WLAN SLEEP 422, the WLAN RUN APP SLEEP 428, THE WLAN & APP SLEEP 434, and THE DEEP SLEEP 438) may result in several scenarios as can be observed in FIG. 4.

Figure 5:
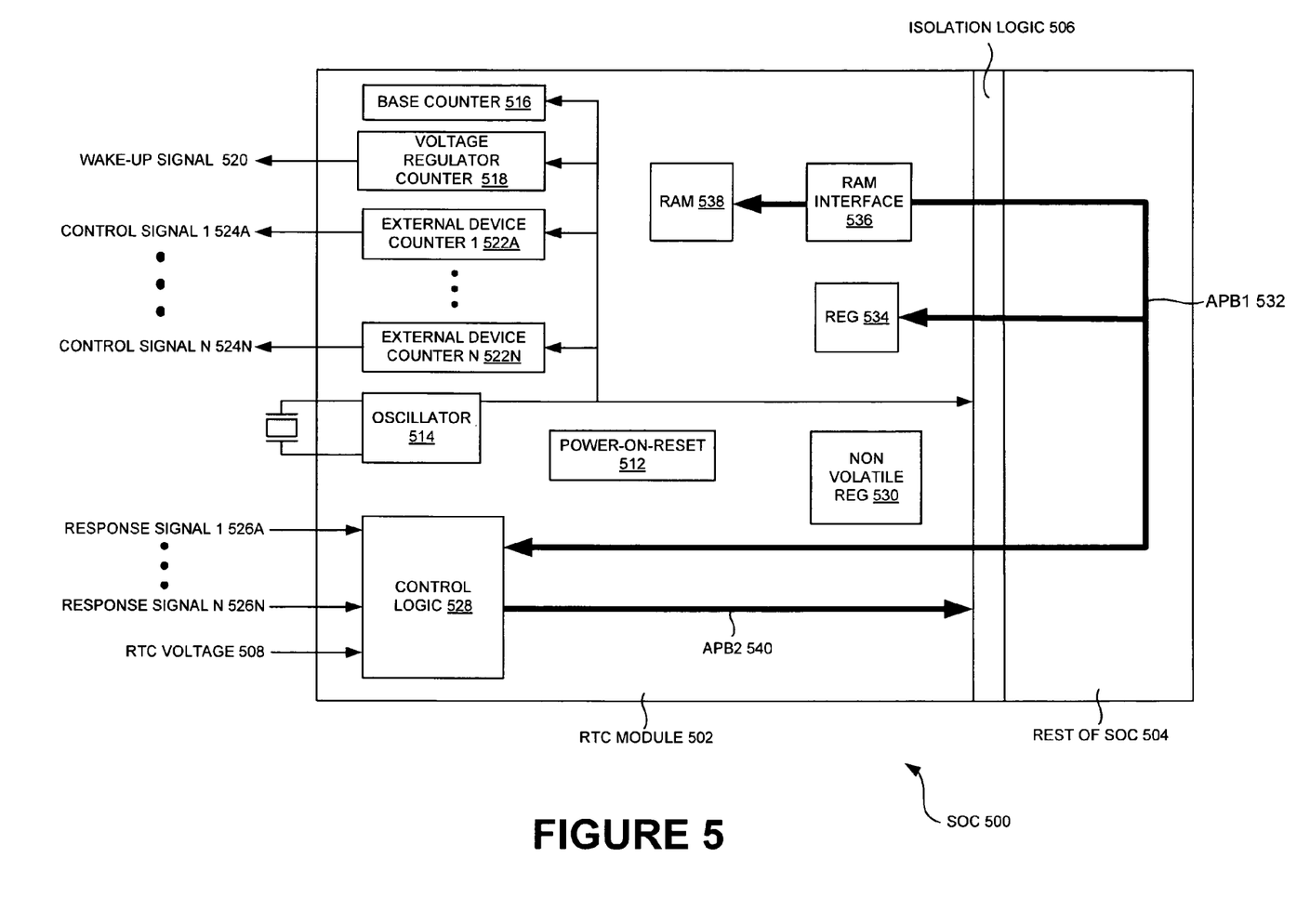
FIG. 5 is an exploded view of a real time counter (RTC) module along with the rest of the low power wireless SOC, according to one embodiment.

The common characteristic of the sleep states may be that both the system voltage and the system clock are available, but the clock to specific parts of the system may be gated. For instance, one of the processors might be in a wireless fidelity (Wi-Fi) mode with its clock gated, while the other processor may be running. The system may be in a deep-sleep state 438 when all parts of the core system are in a sleep state and the 44 MHz oscillator may be switched off. Furthermore, the low power wireless SOC 200 of FIG. 2 draws about 3 micro amps during the deep-sleep state compared to 300 milli-amps drawn by the low power wireless SOC 200 when the rest of the hardware module is operational FIG. 5 is an exploded view of a real time counter (RTC) module 502 along with the rest of SOC 504, according to one embodiment. The RTC module 502 runs on dedicated power supply (e.g., ranging between 1.2 volts and 3.6 volts) provided by a battery (e.g., a RTC voltage 508). The rest of SOC 504 runs on a regulated voltage source (e.g., a SOC voltage). An isolation logic 506 may isolate the RTC module 502 from the rest of SOC 504. A power-on-reset 512 may be activated to reset the SOC 500 (e.g., the wired and/or wireless low power SOC) when a new battery is coupled to the SOC 500. An oscillator 514 may generate a clock signal processed in the SOC 500.

A number of programmable wrap-around counters (e.g., a voltage regulator counter 518, an external device counter 1 522, an external device counter N 522N, etc.) may enable a periodic wake-up of the low power wireless SOC 200 (e.g., through generating a wake-up signal 520) and one or more independent external devices (e.g., through generating a control signal 1 524A, a control signal N 524N, etc.). A number of response signals (e.g., a response signal 1 526A, a response signal N, etc.) may enable a wake-up of the low power wireless SOC 200 (e.g., and/or a low power wired SOC) upon an external event.

The global time may be recorded to mark the external event. If the SOC 500 is already awake, an interrupt may be generated. The RTC module 502 includes a RAM 538 (e.g., a low-leakage non-volatile (battery backed-up) RAM) to enable preserve data while the SOC 500 is switched off. To access the RAM 538 and a non volatile register of the RTC module 502, an advanced peripheral bus (APB) 1 532 may be used. An APB 2 540 may be used to carry other signals.

Furthermore, one or more voltage level shifting cells and/or one or more voltage island cells may be placed between the RTC module 502 and the rest of SOC 504 such that two different voltages (e.g., a voltage between 1.2 volts and 3.6 volts and 1.8 volts, respectively) are separately applied to the RTC module 502 and the rest of SOC 504. The base counter 516 (e.g., which may be automatically reset when a new battery is coupled to the RTC module 502) may keep track of a current time.

In addition, a clock generator (e.g., the oscillator 514 may run at two different frequencies including 32 kHz and 131 kHz) coupled to the RTC module 502 may use a high bias current at first and reduce the high bias current by about 400 percent based on an algorithm of the software module. Moreover, a keep alive memory (e.g., the RAM 538 of 512 bytes) may store the latest reading of the one or more devices. Furthermore, the non-volatile register 530 may store a configuration parameter (e.g., a reset release timing) of the RTC module 502.

Figure 6:
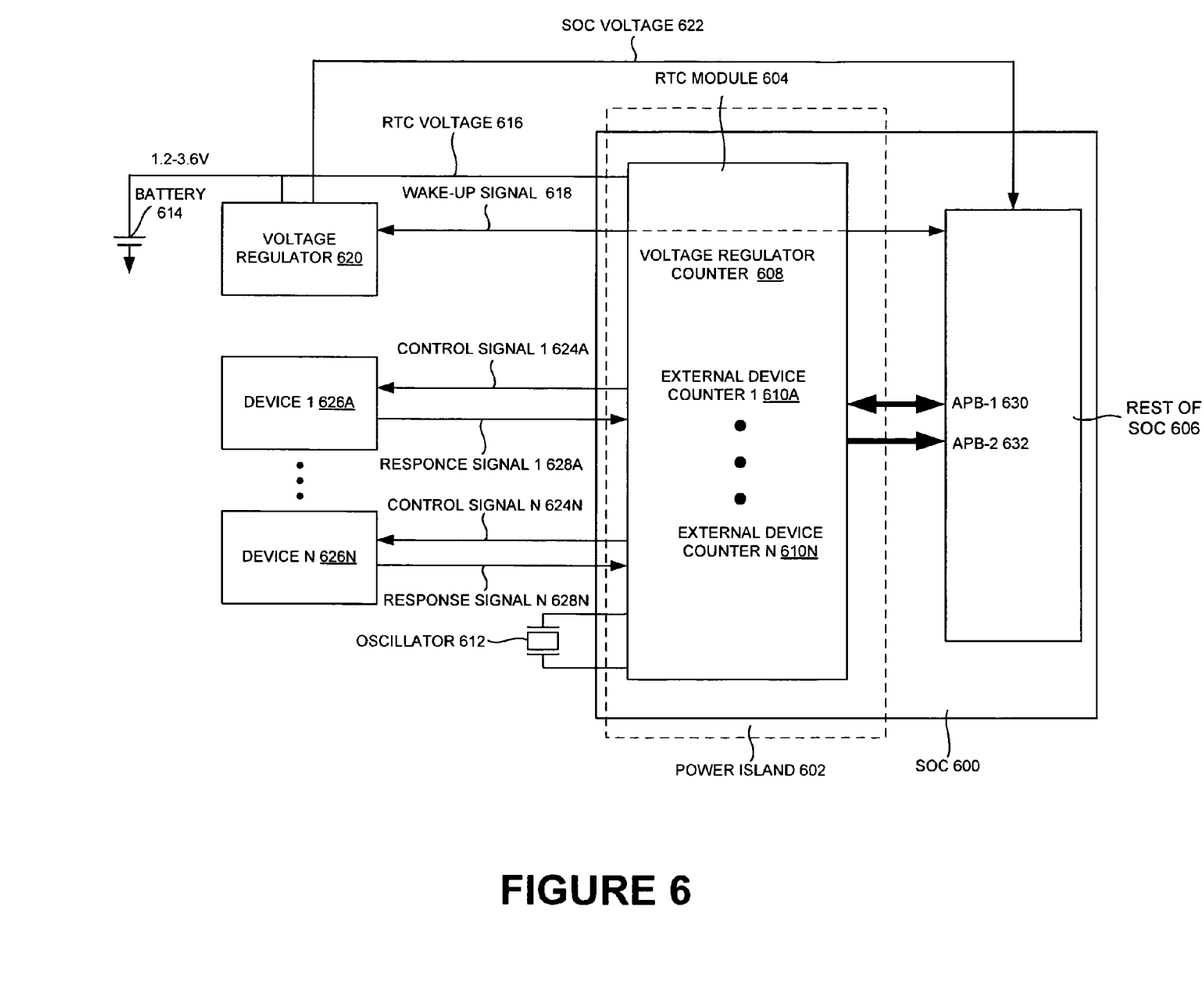
FIG. 6 is a block diagram of the real time counter module of FIG. 2 interacting with external devices, according to one embodiment.

FIG. 6 is a block diagram of the real time counter module of FIG. 2 interacting with external devices, according to one embodiment. In FIG. 6, the SOC 600 is shown with the RTC 602 in a power island 602 isolated from the rest of the SOC 606. The power island 602 allows for the SOC 600 to enter an ultra-low power consumption/Deep-Sleep state (438 in FIG. 4) by powering down all system clocks except for the RTC 602. The RTC 602 may be the only device receiving any power. Power to the die is "islanded" with the RTC module 604 using thick gate techniques that allow it to run directly from the battery 614. This eliminates the power losses associated with a DC/DC converter. Alternatively a voltage regulator 620 (not shown) may be used in such a way that only the RTC is receiving power. This would be useful in cases where the higher voltage may cause more power consumption than the regulator loss.

In FIG. 6, the RTC module 604 is shown used in conjunction with a battery 614 (e.g., an external battery having a voltage ranging between 1.2 volts and 3.6 volts) while the rest of the SOC 606 is powered by a voltage regulator 620 (e.g., an external DC/DC converter outputting 1.8 volts). Being powered all the time, the RTC module 604 periodically (e.g., and/or according to a set schedule) wakes up the SOC 600 through generating a wake-up signal 618. The RTC module 604 may monitor a device 626 (e.g., an external device such as a sensor device) through generating a control signal 624 (e.g., with and/or without the rest of SOC 606 up).

A response signal 628 (e.g., an alarm signal from the device 626) may wake up the SOC 600 on an external event. The resolution of the voltage regulator counter 608, the external device counter 1 610, and the external device counter N 610N may be one clock cycle, but in practice the absolute resolution may depend on the crystal frequency of the SOC 600. In one example embodiment, a maximum delay between two consecutive wake-ups (e.g., which may be initiated by the wake-up signal 618) may be defined by a length of the counters (e.g., the voltage regulator counter 608, the external device counter 1 610, the external device counter N 610N, etc.), such as 34 bits. In another example embodiment, two types of batteries may be used (e.g., 1.5 volts and 3.6 volts), the RTC module 604 may have to support a power range between 1.2 volts and 3.6 volts. The rest of SOC 606 may always run on 1.8 volts demanding the voltage regulator 620 (e.g., a step-up or a step-down DC/DC converter).

In yet another example embodiment, the voltage isolation may not have to take place exactly on the RTC 602 boundary. A power island 602 may be moved deeper into the RTC module 604 so that all unused portions of the RTC module 604 may be powered down as well. Since the SOC 600 includes two independent CPUs (e.g., the ARM 7 216 and the WLAN MAC 206), two independent APB busses are used. The APB 1 630 may be used for reading and writing to all internal registers as well as the RAM 538 of FIG. 5. The APB 2 632 may be used only for reading a value of the RTC counters.

Furthermore, a voltage regulator counter of the RTC module 604 may generate the wake-up signal 618 to the voltage regulator 620 internal or external to the SOC 600 to supply the rest of SOC 606 with the SOC voltage 622 of the voltage regulator 620 based on a preprogrammed schedule and/or the response signal 628 of the device 626 (e.g., a sensor device). Also, a device counter (e.g., an external device counter 610) of the RTC module 604 may generate the control signal 624 to access the device 626 to obtain the response signal 628 (e.g., the response signal 628 includes an alarm signal generated by the device 626).

Figure 7:
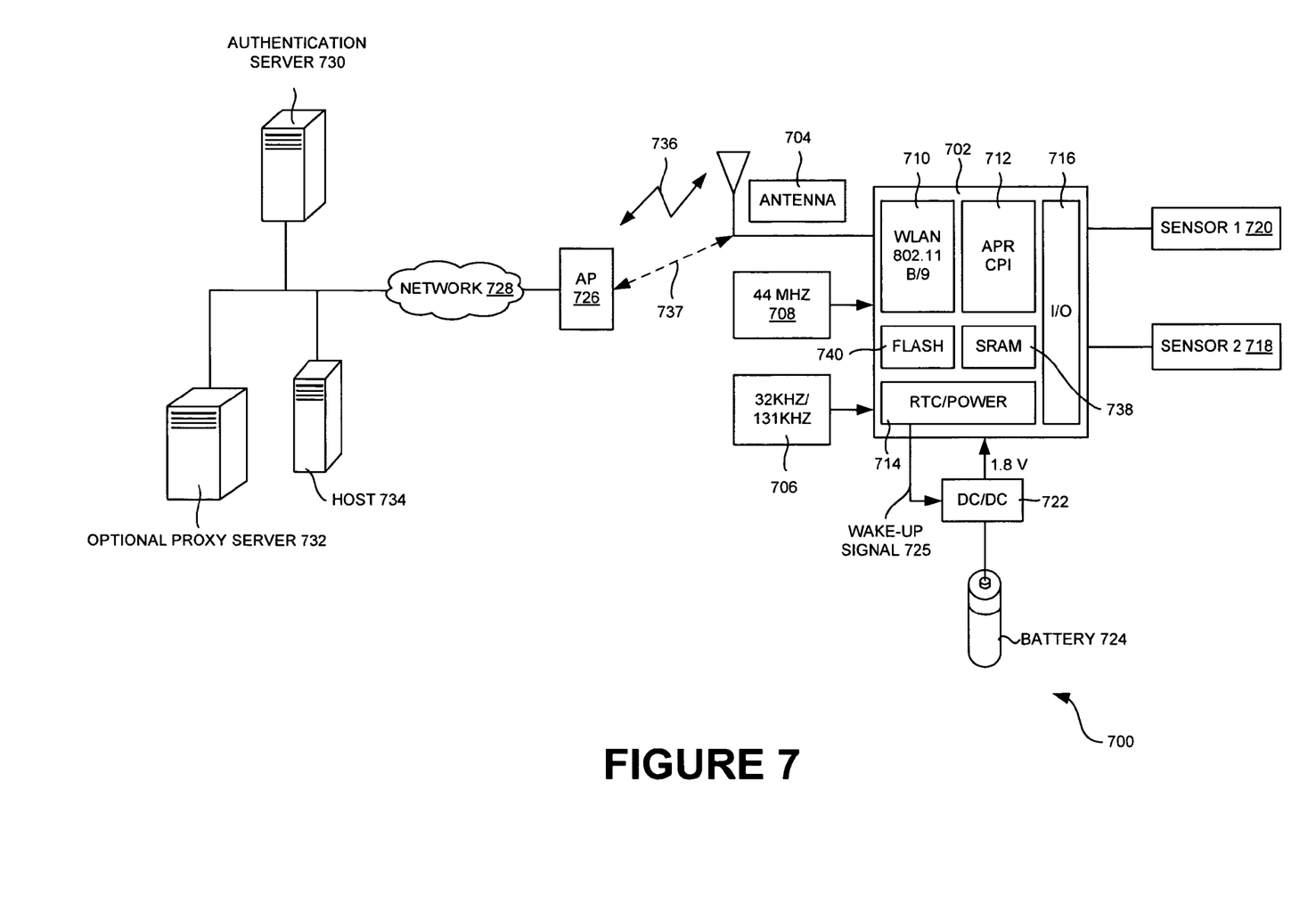
FIG. 7 is a low power wireless SOC interacting with a host through an access point, according to one embodiment.

FIG. 7 is a low power wireless/wired SOC 702 interacting with a host 734 through an access point 726, according to one embodiment. The antenna 704 may be used to receive and/or transmit wireless data 736 (e.g., and/or wired data 737) to and/or from the access point 726 (e.g., a gateway). A 32 kHz/131 kHz low-power crystal oscillator 704 may be used to drive a real time counter (RTC) 714 and a 44 MHz oscillator 708 may be used to drive a WLAN 710 and application (APP) CPUs. A flash memory 740 and a SRAM 738 may be used for a firmware update and/or a key management in encryption/decryption cores. The RTC 714 may be also used to provide global time and date to the low power wireless SOC 700 (e.g., which may have a dedicated power supply). In one example embodiment, the low power wired/wireless SOC 702 may be connected to two sensor devices (e.g., a sensor 1 720 and a sensor 2 718) via an I/O interface 716. The low power wireless/wired SOC 702 may be powered by a battery 724 via a DC/DC converter 722 which converts the battery voltage to 1.8 V required for the operation of the low power wireless SOC 700.

In FIG. 7, data communication may take place between the sensors and the AP 726 via the low power wireless/wired SOC 702 (e.g., which is compliant with the IEEE 802.11). The AP 726 may be connected via a network 728 to an authentication server 730 (e.g., which may be used to provide authentication services to the host 734), a optional proxy server 732, etc.

Furthermore, one or more external devices (e.g., the sensor 1 720, the sensor 2 718, etc.) may perform one or more functions based on a control signal processed in each of the one or more external devices. The low power wireless/wired SOC 702 having the RTC 714 (e.g., which is communicatively coupled to the one or more external devices) may periodically generate the control signal (e.g., a wake-up signal 725) during a non-operational stage (e.g., and/or during an operational stage) of the low power wireless/wired SOC 702 to minimize a power consumption. In addition, the WLAN 710 may communicate with the access point (AP) 726 using a radio (e.g., conforming to 802.11 a/b/g standard) based on an alarm signal generated by the each of the one or more external devices.

Figure 8:
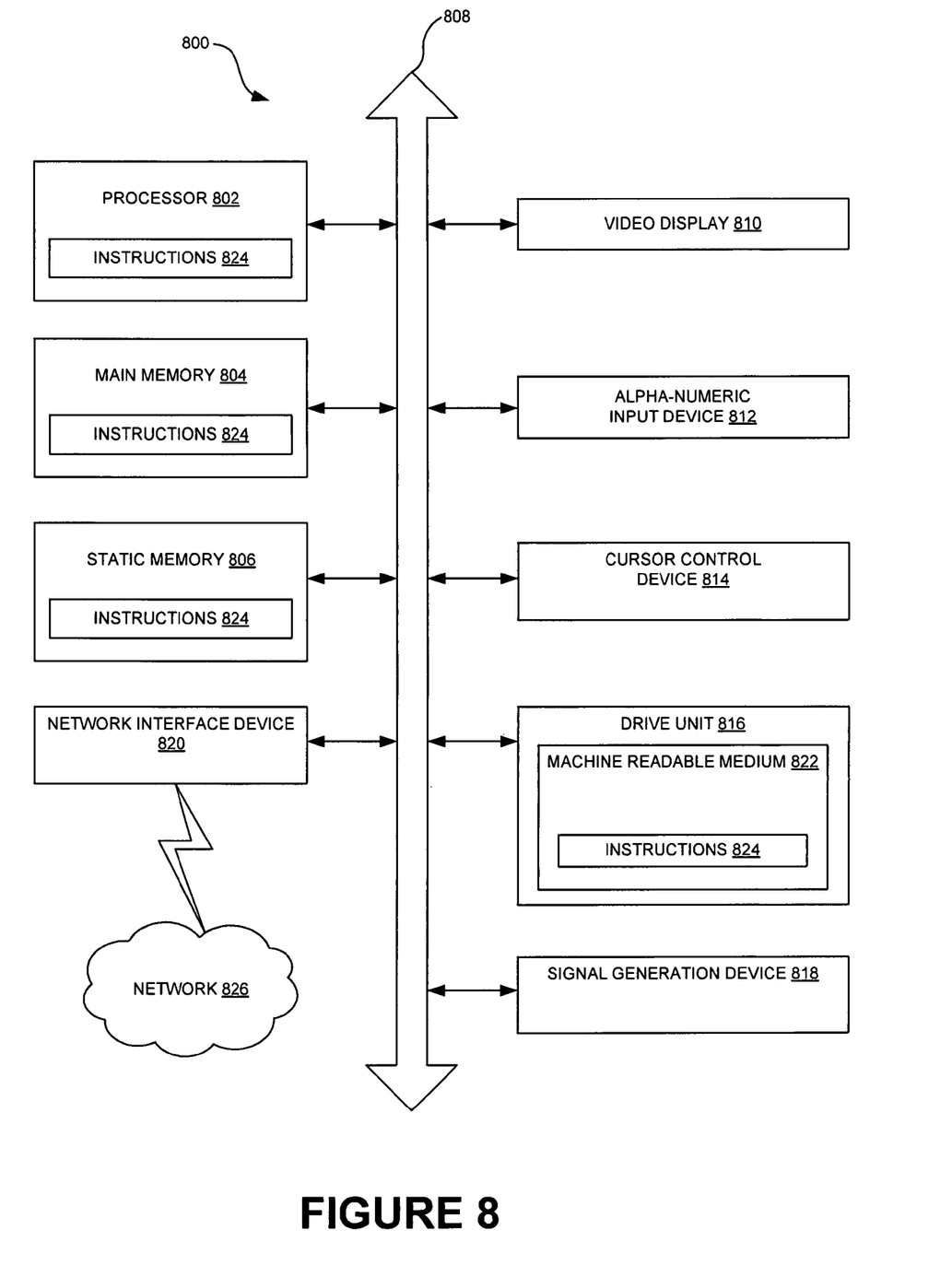
FIG. 8 is a diagrammatic system view 800 of a data processing system in which any of the embodiments disclosed herein may be performed, according to one embodiment.

FIG. 8 is a diagrammatic representation of a computer system 800 capable of processing a set of instructions to perform any one or more of the methodologies herein, according to one embodiment. In various embodiments, the machine operates as a standalone device and/or may be connected (e.g., networked) to other machines. In a networked deployment, the machine may operate in the capacity of a server and/or a client machine in server-client network environment, and/or as a peer machine in a peer-to-peer (or distributed) network environment.

The machine may be a personal computer (PC), a tablet PC, a set-top box (STB), a Personal Digital Assistant (PDA), a cellular telephone, a web appliance, a network router, switch and/or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 800 includes a processor 802 (e.g., a central processing unit (CPU) a graphics processing unit (GPU) and/or both), a main memory 804 and a static memory 806, which communicate with each other via a bus 808. The computer system 800 may further include a video display unit 810 (e.g., a liquid crystal display (LCD) and/or a cathode ray tube (CRT)). The computer system 800 also includes an alphanumeric input device 812 (e.g., a keyboard), a cursor control device 814 (e.g., a mouse), a disk drive unit 816, a signal generation device 818 (e.g., a speaker) and a network interface device 820.

The disk drive unit 816 includes a machine-readable medium 822 on which is stored one or more sets of instructions (e.g., software 824) embodying any one or more of the methodologies and/or functions described herein. The software 824 may also reside, completely and/or at least partially, within the main memory 804 and/or within the processor 802 during execution thereof by the computer system 800, the main memory 804 and the processor 802 also constituting machine-readable media.

The software 824 may further be transmitted and/or received over a network 826 via the network interface device 820. While the machine-readable medium 822 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signals.

Figure 9A:
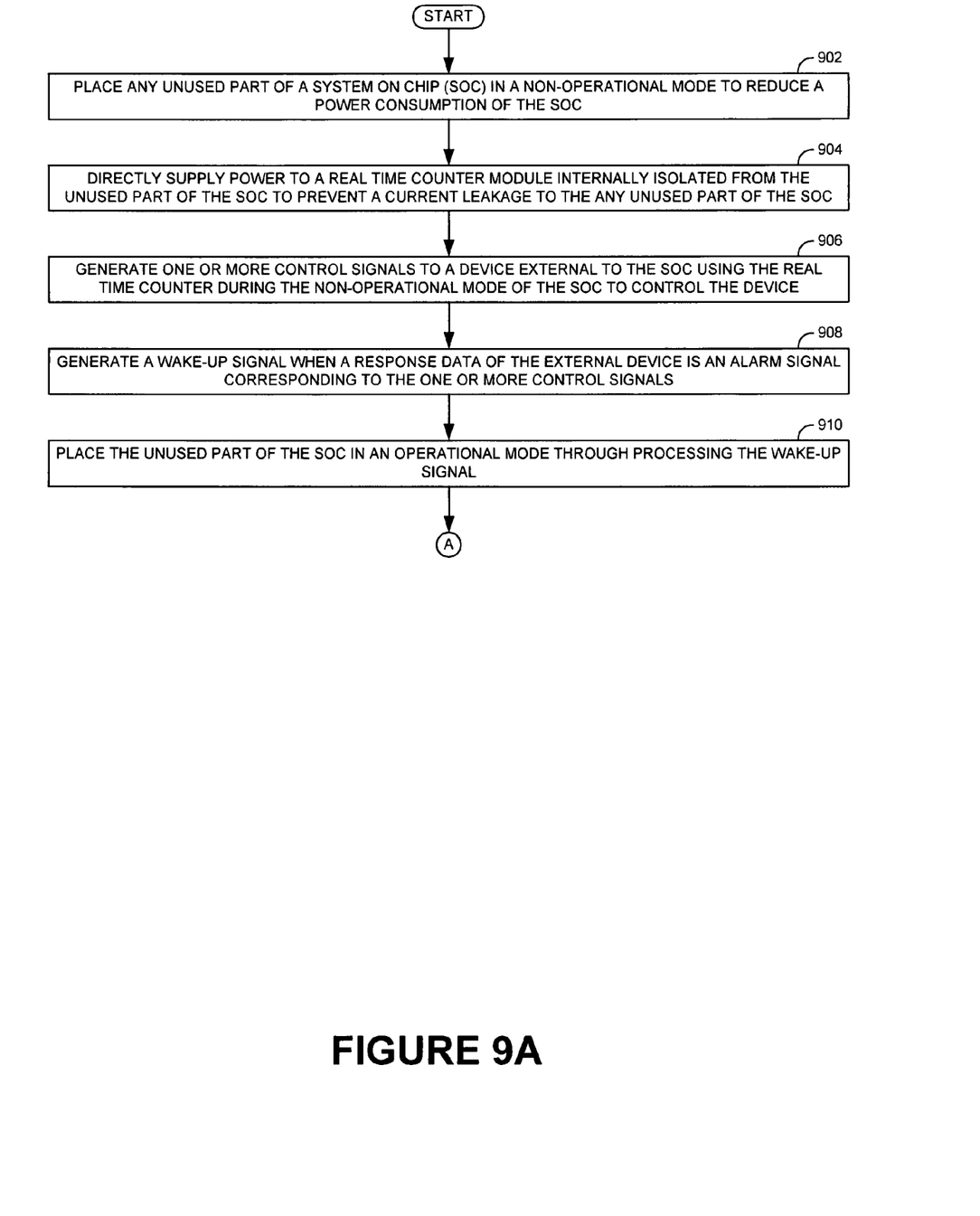
FIG. 9 is a process flow of generating one or more control signals to a device external to a system on a chip using a real time counter module during a non-operational mode to control the device, according to on embodiment.
Figure 9B:
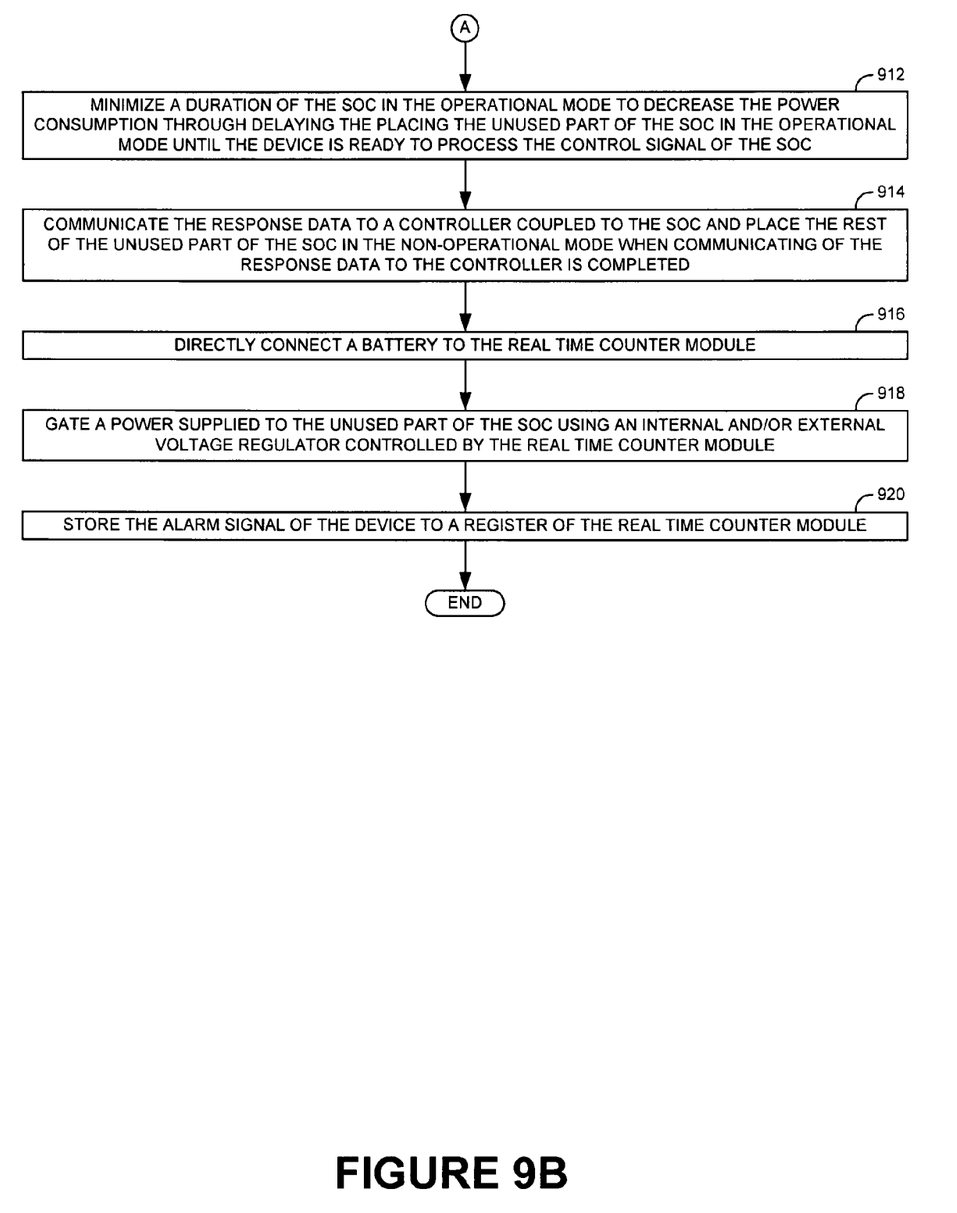

FIG. 9 (FIGS. 9A and 9B) is a process flow of generating one or more control signals to a device external to a system on chip using a real time counter module during a non-operational mode to control the device, according to one embodiment. In operation 902, any unused part of a system on chip (e.g., the rest of SOC 504 of FIG. 5) may be placed in a non-operational mode to reduce a power consumption of the system on chip (e.g., the SOC 500). In operation 904, power may be directly supplied to a real time counter module (e.g., the RTC module 502) internally isolated from the any unused part of the system on chip to prevent a current leakage to the any unused part of the system on chip.

In operation 906, one or more control signals (e.g., the control signal 624 of FIG. 6) may be generated to a device (e.g., the device 626) external to the system on chip using the real time counter module during the non-operational mode to control the device. In operation 908, a wake-up signal may be generated when a response data (e.g., the response signal 628) of the device is an alarm signal corresponding to the one or more control signals. In operation 910, the any unused part of the system on chip may be placed in an operational mode through processing the wake-up signal. In operation 912, a duration of the system on chip in the operational mode may be minimized to decrease the power consumption through delaying the placing the any unused part of the system on chip in the operational mode until the device is ready to process the control signal of the system on chip.

In operation 914, the response data may be communicated to a controller (e.g., the controller 106 of FIG. 1 and/or the authentication server 730, the optional proxy server 732, and the host 734 of FIG. 7) coupled to the system on chip and the rest of the any unused part of the system on chip may be placed in the non-operational mode when communicating of the response data to the controller is completed. In operation 916, a battery (e.g., the battery 614) may be directly connected to the real time counter module. In operation 918, a power supplied to the any unused part of the system on chip may be gated using an internal or external voltage regulator (e.g., the voltage regulator 620) controlled by the real time counter module. In operation 920, the alarm signal of the device may be stored to a random access memory (e.g., the RAM 538) of the real time counter module.

Although the present embodiments have been described with reference to specific example embodiments, it will be evident that various modifications and changes may be made to these embodiments without departing from the broader spirit and scope of the various embodiments. For example, the various devices, modules, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated ASIC circuitry and/or in Digital Signal; Processor DSP circuitry).

Also, the method may be in a form of a machine-readable medium embodying a set of instructions that, when executed by a machine, cause the machine to perform any method disclosed herein. It will be appreciated that the various embodiments discussed herein may/may not be the same embodiment, and may be grouped into various other embodiments not explicitly disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A system on chip, comprising:
    a hardware module including at least one of a microcontroller, a microprocessor, a DSP core, a memory, a timing source, a peripheral, and an external interface to have a real time counter module isolated from the rest of the hardware module using at least one of a plurality of voltage level shifting cells and a plurality of voltage island cells;
    a software module associated with the real time counter module to generate at least one control signal to at least one device external to the system on chip during a sleep mode of the system on chip to communicate with the at least one device, wherein the sleep mode places any unused part of the system on chip in a non-operational mode to reduce the power consumption of the system on chip;
    a voltage regulator control counter of the real time counter module generates a wake-up signal to a voltage regulator of the system on chip to supply the rest of the hardware module with power based on at least one of a preprogrammed schedule and a response signal from an external device; and
    a device control counter of the real time counter module to generate the at least one control signal to access the at least one device to obtain the response signal, wherein the response signal includes at least an alarm signal generated by the at least one device.

2. The system on chip of claim 1, wherein the system on chip during the sleep mode draws at most one tenth of power consumed by the system on chip during an operational mode.

3. The system on chip of claim 2, wherein the at least one of the plurality of voltage shifting cells and the plurality of voltage island cells is placed between the real time counter module and the rest of the hardware module such that two different voltages are separately applied to the real time counter module and the rest of the hardware module.

4. The system on chip of claim 3, wherein the real time counter module is powered directly by a battery.

5. The system on chip of claim 4, further comprising a base counter of the real time counter module to keep track of a current time, wherein the base counter is automatically reset when a new battery is coupled to the real time counter module.

6. The system on chip of claim 1, wherein the external device includes a sensor device and wherein the voltage regulator is at least one of an external voltage regulator and an internal voltage regulator.

7. The system on chip of claim 6, further comprising a clock generator coupled to the real time counter module to use a high bias current at startup and to reduce the high bias current by about 400 percent based on an algorithm of the software module.

8. The system on chip of claim 7, further comprising a keep alive memory to store a latest reading of the at least one device, wherein the keep alive memory to include a random access memory of at least 64 bytes.

9. The system on chip of claim 8, further comprising a non-volatile register to store a configuration parameter of the real time counter module, wherein the configuration parameter to include at least a reset release timing.

10. A method, comprising:
   placing any unused part of a system on chip in a non-operational mode to reduce power consumption of the system on chip;
   directly supplying power to a real time counter module internally isolated from the unused part of the system on chip to prevent current leakage to the unused part of the system on chip;
   generating at least one control signal to a device external to the system on chip using the real time counter module during the non-operational mode to control the device; and
   gating a power supplied to the unused part of the system on chip using at least one of an internal voltage regulator and an external voltage regulator controlled by the real time counter module, wherein the at least one control signal is generated by a device control counter of the real time counter module to generate the at least one control signal to access the device to obtain a response signal, wherein the response signal includes at least an alarm signal generated by the device.

11. The method of claim 10, further comprising generating a wake-up signal when a response data of the device is an alarm signal corresponding to the at least one control signal.

12. The method of claim 11, further comprising placing the any unused part of the system on chip is placed in an operational mode through processing the wake-up signal.

13. The method of claim 12, further comprising minimizing the duration of the system on chip in the operational mode to decrease the power consumption through delaying the placing of the unused part of the system on chip in the operational mode until the device is ready to process the control signal of the system on chip.

14. The method of claim 13, further comprising,
   communicating the response data to a controller coupled to the system on chip; and
   placing the rest of the any unused part of the system on chip in the non-operational mode when the communicating the response data to the controller is completed.

15. The method of claim 14, further comprising directly connecting a battery to the real time counter module, wherein a voltage of the battery ranges between 1.2 volts and 3.6 volts.

16. The method of claim 10, further comprising storing the alarm signal of the device to a register of the real time counter module, wherein the register is about 512 bytes.

17. The system of claim 16, further comprising storing a time stamp of the alarm signal to the register of the real time counter module.

18. A machine-readable non-transitory medium embodying a set of instructions that, when executed by a machine, causes the machine to perform a method comprising:
   placing any unused part of a system on chip in a non-operational mode to reduce power consumption of the system on chip;
   directly supplying power to a real time counter module internally isolated from the unused part of the system on chip to prevent current leakage to the unused part of the system on chip;
   generating at least one control signal to a device external to the system on chip using the real time counter module during the non-operational mode to control the device; and
   gating a power supplied to the unused part of the system on chip using at least one of an internal voltage regulator and an external voltage regulator controlled by the real time counter module, wherein the at least one control signal is generated by a device control counter of the real time counter module to generate the at least one control signal to access the device to obtain a response signal, wherein the response signal includes at least an alarm signal generated by the device.

19. A system, comprising:
   a plurality of external devices to perform at least one function based on a control signal processed in each of the plurality of external devices;
   a system on chip having a real time counter module communicatively coupled to the plurality of external devices to periodically generate the control signal during a non-operational stage of the system on chip to minimize a power consumption of the system on chip, wherein a voltage regulator control counter of the real time counter module generates a wake-up signal to a voltage regulator of the system on chip to supply the rest of a hardware module with power based on at least one of a preprogrammed schedule and a response signal from one of the plurality of external devices; and
   a device control counter of the real time counter module to generate the control signal to access the plurality of external devices to obtain the response signal, wherein the response signal includes at least an alarm signal generated by one of the plurality of external devices.

20. The system of claim 19, further comprising at least one of a wired module and a wireless module of the system on chip to communicate with a network associated with the system on chip based on an alarm signal generated by the each of the plurality of external devices.

* * * * *